United States Patent
Yao et al.

(10) Patent No.: US 6,619,105 B1
(45) Date of Patent: Sep. 16, 2003

(54) GLIDE HEAD WITH ANTI-COLLAPSING PROTECTION FEATURE

(75) Inventors: Wei H. Yao, Fremont, CA (US); David S. Kuo, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/834,039

(22) Filed: Apr. 12, 2001

Related U.S. Application Data
(60) Provisional application No. 60/196,795, filed on Apr. 12, 2000.

(51) Int. Cl.[7] .............................. G01B 5/28; G01B 7/34
(52) U.S. Cl. ......................................................... 73/105
(58) Field of Search .......................... 73/105; 360/236.6, 360/235.8, 234.6, 236.3, 234.3, 235.4

(56) References Cited

U.S. PATENT DOCUMENTS

| | | | |
|---|---|---|---|
| 4,553,184 A | * 11/1985 | Ogishima | ................. 360/235.8 |
| 4,636,894 A | 1/1987 | Mo | |
| 4,646,180 A | 2/1987 | Ohtsubo | |
| 4,757,402 A | 7/1988 | Mo | |
| 4,802,042 A | 1/1989 | Strom | |
| 5,010,429 A | 4/1991 | Taguchi et al. | |
| 5,079,657 A | * 1/1992 | Aronoff et al. | ........... 360/236.6 |
| 5,162,073 A | 11/1992 | Aronoff et al. | |
| 5,231,613 A | 7/1993 | Nakayama et al. | |
| 5,768,055 A | 6/1998 | Tian et al. | |
| 5,774,303 A | 6/1998 | Teng et al. | |
| 5,808,184 A | * 9/1998 | Boutaghou et al. | ............ 73/105 |
| 5,815,346 A | * 9/1998 | Kimmal et al. | ........... 360/236.6 |
| 5,841,608 A | 11/1998 | Kasamatsu et al. | |
| 5,942,680 A | * 8/1999 | Boutaghou | .................... 73/105 |
| 5,991,118 A | * 11/1999 | Kasamatsu et al. | ....... 360/236.6 |
| 6,188,547 B1 | 2/2001 | Gui et al. | |
| 6,195,235 B1 | 2/2001 | Boutaghou et al. | |
| 6,212,042 B1 | 4/2001 | Gui et al. | |
| 6,233,118 B1 | 5/2001 | Boutaghou et al. | |
| 6,381,098 B1 | 4/2002 | Boutaghou et al. | |
| 6,466,410 B2 | 10/2002 | Polycarpou et al. | |

FOREIGN PATENT DOCUMENTS

| | | | | |
|---|---|---|---|---|
| JP | 54-23517 | * | 2/1979 | .............. 360/236.6 |
| JP | 54-80728 A | | 6/1979 | |
| JP | 56-107363 A | | 8/1981 | |
| JP | 59-193580 | * | 11/1984 | .............. 360/236.6 |
| JP | 63-037874 A | | 2/1988 | |
| JP | 3-252922 A | | 11/1991 | |
| JP | 6-44717 A | | 2/1994 | |
| JP | 8-293111 A | | 11/1996 | |
| JP | 9-219077 A | | 8/1997 | |
| WO | 07503 | | 2/1997 | |

OTHER PUBLICATIONS

"Design of Laser Tone Texture for Low Glide Media" by David Kuo et al, for IEEE Transactions on Magnetics, vol. 32, No. 5, Sep. 1996.

"Dynamics of Glide Head in the Proximity Contact Regime" by Wei Yao et al., for IEEE Transactions on Magnetics, vol. 35, No. 5, Sep. 1999.

U.S. patent application Ser. No. 09/489,882, Polycarpou et al., filed Jan. 21, 2000.

* cited by examiner

*Primary Examiner*—Daniel S. Larkin
(74) *Attorney, Agent, or Firm*—Westman, Champlin & Kelly, P.A.

(57) ABSTRACT

A glide head supporting a glide transducer for glide test operations. The glide head includes a textured glide interface for glide height stability. The textured glide interface provides an anti-collapse protection feature for glide test operations.

20 Claims, 6 Drawing Sheets

GLIDE HEAD WITH ANTI-COLLAPSING PROTECTION FEATURE

CROSS-REFERENCE TO RELATED APPLICATION

The present application claims priority to No. 60/196,765, filed Apr. 12, 2000 and entitled "ANTI-COLLAPSING GLIDE HEAD DESIGN".

FIELD OF THE INVENTION

The present invention relates to a glide head for quality control testing. In particular, the present invention relates to a glide head for quality control testing for discs of data storage devices.

BACKGROUND OF THE INVENTION

Disc drives are used for storing information, typically as magnetically encoded data and more recently as optically encoded data on a disc surface. Recording heads read data from or write data to the discs. Glide tests are used to test a disc surface for defects. During a glide test, a glide head flies over a disc surface at a predetermined clearance known as a glide height or fly height.

Contacts between the glide head and the disc surface are detected during the glide tests via a glide transducer on the glide head. The transducer detects or measures vibration of the glide head upon contact with the disc surface. The vibration can be measured with a piezoelectric transducer (PZT) which generates a varying potential difference between the electrodes of the PZT due to forces imparted to the transducer. Specifically, when the glide head interacts with a defect on the spinning disc, simultaneously excited vibration modes of the PZT and the glide head result in voltage fluctuations at corresponding frequencies. If the magnitude of the measured voltages exceeds predetermined threshold values, the disc may be rejected. Other types of glide transducers can be used for measurement, such as thermal asperity detectors or capacitance detectors.

As areal storage densities on disc recording media become higher, fly heights of data or read-write heads becomes smaller. Lower fly heights for the read-write heads impose narrower restrictions on acceptable heights of asperities or defects on the disc surface, since larger asperities or defects increase propensity for head-disc interface or contact. The glide quality of a disc relates to the ability of a head to fly adjacent to the disc surface at the predetermined glide height without colliding or interfacing with the disc surface.

The glide head is supported above the disc surface at the glide height via rotation of a disc supported on a test spindle by a spindle motor. It is desirable to maintain a stable glide height for glide test operations. For operation, the spindle motor rotates the test spindle at a lower revolution per minute (RPM) than rotation or operating speeds for discs of recording head drives. Glide test operation at lower RPMs and lower glide heights increases glide height instability and likelihood of glide head collapse potentially interfering with or interrupting glide test operations. The present invention addresses these and other problems and offers solutions not previously recognized nor appreciated.

SUMMARY OF THE INVENTION

The present invention relates to a glide head supporting a glide transducer for glide test operations. The glide head includes a textured glide interface for glide height stability. The textured glide interface provides an anti-collapse protection feature for glide test operations. The present invention is characterized by these and other features as illustrated in the described embodiments.

DETAILED DESCRIPTION OF ILLUSTRATIVE EMBODIMENTS

Figure 1:
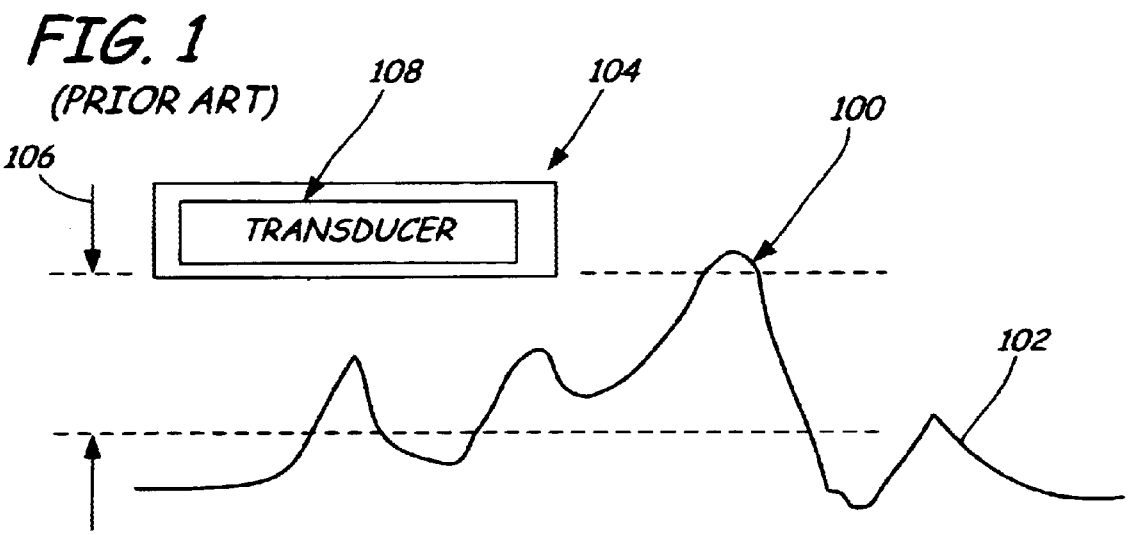
FIG. 1 is a schematic illustration of a glide head for detecting asperities for glide test operations.

FIG. 1 schematically illustrates a glide test operation for detecting asperities or defects 100 in a disc surface 102. For glide test operations, a glide head 104 flies above the disc surface 102 at a predetermined glide height 106. The glide head 104 includes a glide test transducer 108 (illustrated schematically) to detect interface between the glide head 104 and the asperity or defects 100 on the disc surface 102 for quality control measurement.

The glide height 106 for the glide head 104 is determined based upon a measured glide avalanche break point (GABP) of the disc surface. The GABP is a measure of the height of the surface topography of the mean surface of the disc. Below the GABP, a data or recording head adapted to read or write data from or to a data storage disc will have massive contacts with the disc surface. Thus, GABP of the disc surface is used to measure asperities or defects in the disc surface.

Figure 2:
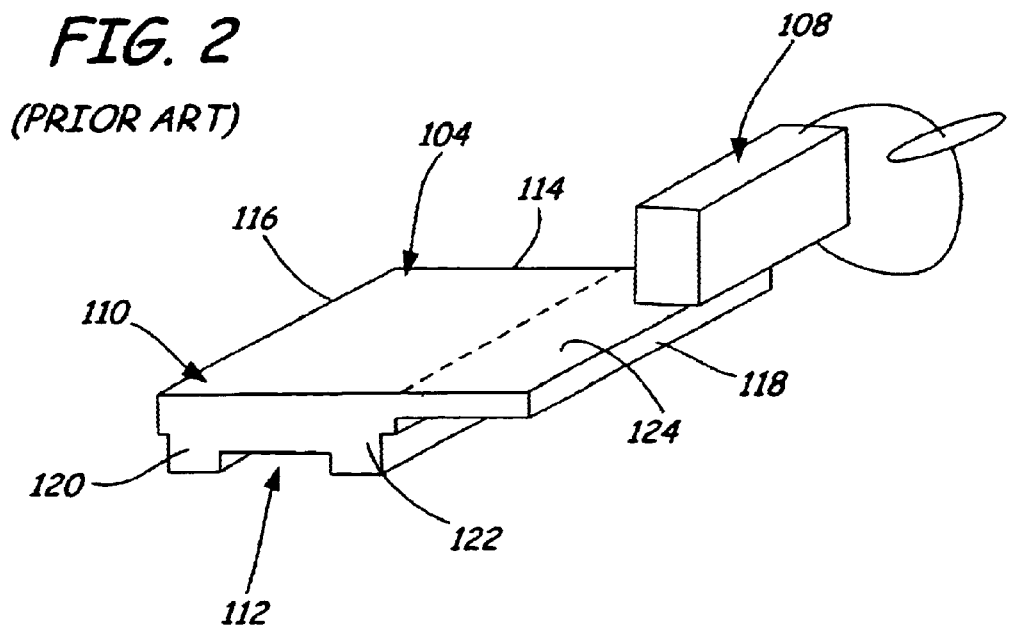
FIG. 2 is an illustration of a prior art glide head for glide test operations.

FIG. 2 illustrates an embodiment of glide head 104. As shown glide head 104 includes a glide body 110 having a leading edge 112, trailing edge 114, and opposed sides 116, 118. The glide body 104 includes raised air bearing surfaces 120, 122. For operation, rotation of the disc creates an air flow along the bearing surfaces 120, 122 between the leading and trailing edges 112, 114 of the glide body 110 to provide a hydrodynamic lift force so that the glide head 104 flies above the disc surface for glide testing. In the embodiment shown, the glide transducer 108 is supported on a wing portion 124 of the glide body 110 for glide test operations.

The glide test transducer 108 is supported on wing portion 124 to detect glide head-disc interface for glide testing. In the embodiment illustrated in FIG. 2, the glide test transducer 108 is a piezoelectric transducer (PZT). The PZT transducer provides feedback as a voltage fluctuation in response to contact force or vibration due to head-disc interface. The feedback from the PZT transducer is processed to determine if the voltage exceeds a threshold to detect contact or asperities on the disc surface. Alternate glide transducers include capacitance transducers, thermal transducers or other suitable transducers for contact based asperity detection.

Figure 3:
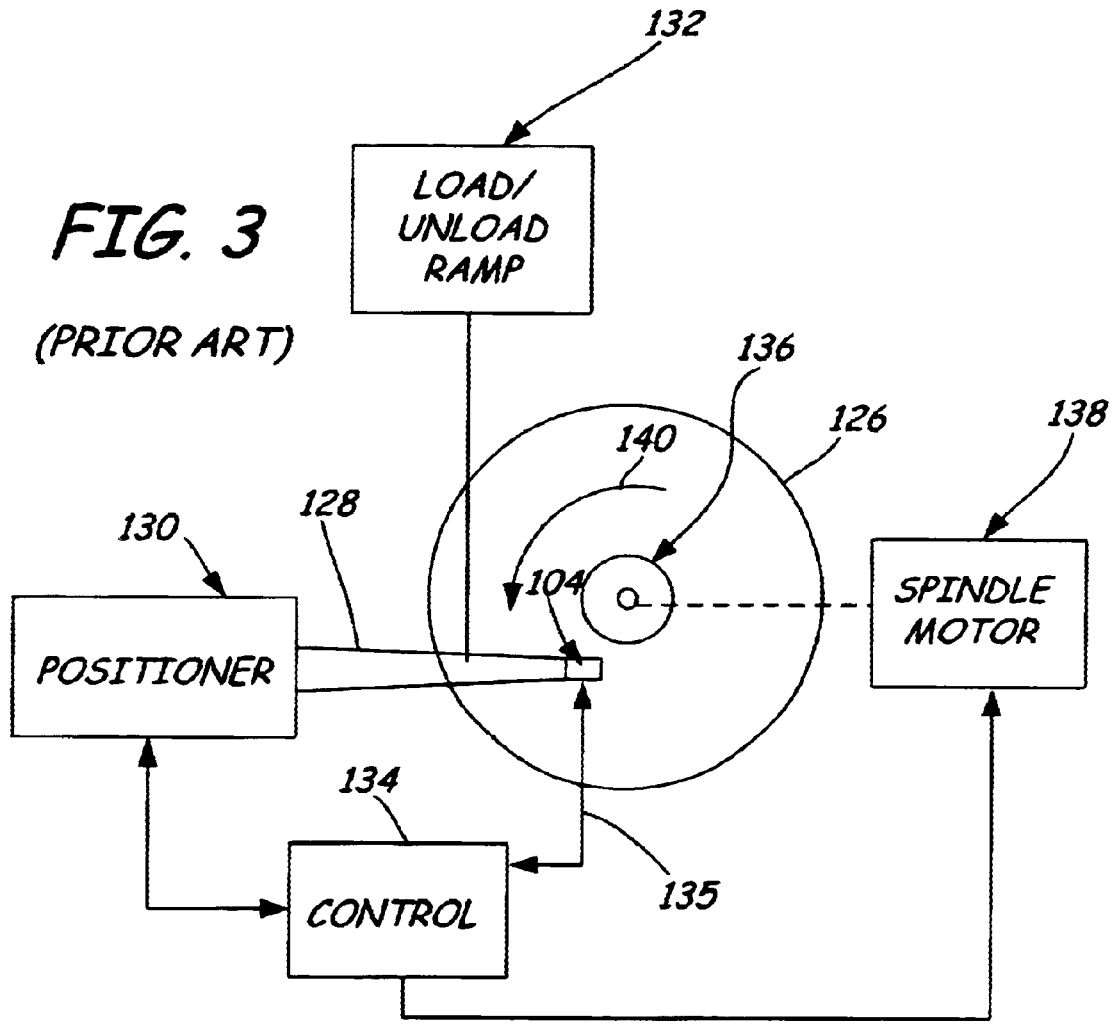
FIG. 3 is a schematic illustration of a glide testing operation.

For glide test operation, glide head 104 is supported above a test disc 126 by an armature assembly 128 coupled to positioner 130 to position the glide head 104 relative to the disc surface for glide test operations as illustrated in FIG. 3. Prior to operation, the glide head 104 is supported by a load/unload ramp 132 illustrated diagrammatically. Positioner 130 moves armature 128 under control of controller 134 for glide testing an area of the disc surface (concentric data tracks) between an inner diameter and an outer diameter of the disc. Feedback 135 from the glide transducer is processed for test operations.

Test disc 126 is rotationally supported by a test spindle 136. A spindle motor 138 rotates the test spindle 136. The spindle motor 138 is coupled to controller 134 which is configured to rotate the test spindle 136 at a relatively low RPM as illustrated by arrow 140 to support glide head 104 at a relatively low glide height for test operations. Operating RPM ranges for test spindles 136 are lower than RPM operating ranges for disc spindles for certain disc drives. For example, the RPM operating range for a test spindle is generally at or below 1,000 RPM in contrast to higher RPM operating ranges of 3,600 RPM for disc spindles for certain recording head drives.

Figure 4:
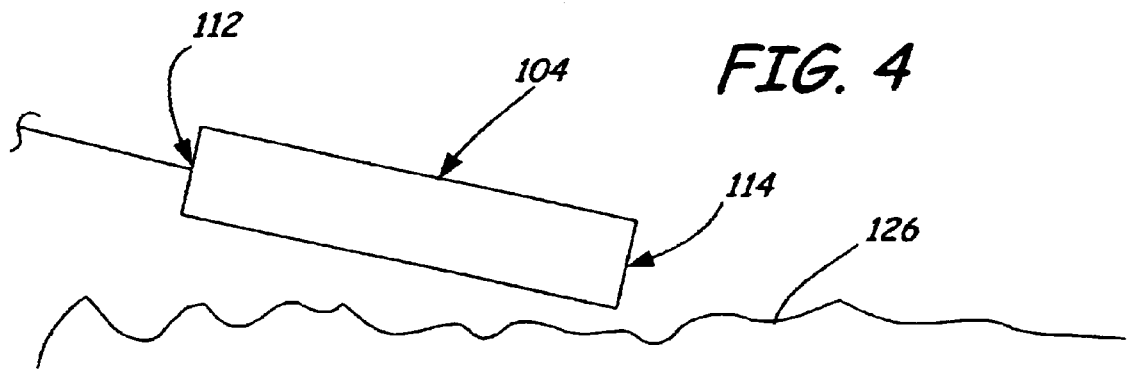
FIG. 4 is a schematic diagram illustrating glide head collapse during glide test operations.
Figure 5:
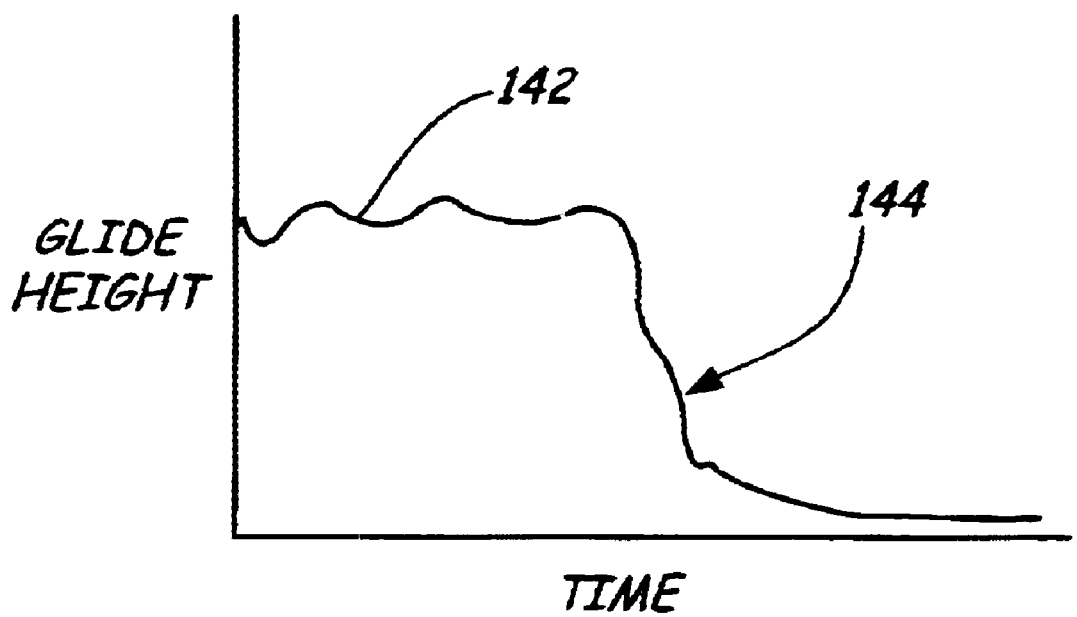
FIG. 5 schematically illustrates a profile of the glide head relative to a disc surface during test operations.

During operation, the glide head 104 is supported relative to the test disc 126 at a pitch angle at a glide height above the disc surface, with the trailing edge 114 of the glide head 104 supported closer to the disc surface than the leading edge 112 as illustrated in FIG. 4. For glide test operations, it is desirable to maintain a constant glide height as illustrated at 142 of FIG. 5. As shown in FIG. 5, glide height 142 can collapse as illustrated by decay 144 in FIG. 5. The glide head of the present invention includes an anti-collapse protection feature to control glide height stability to limit interruption of glide test operations.

Figure 6:
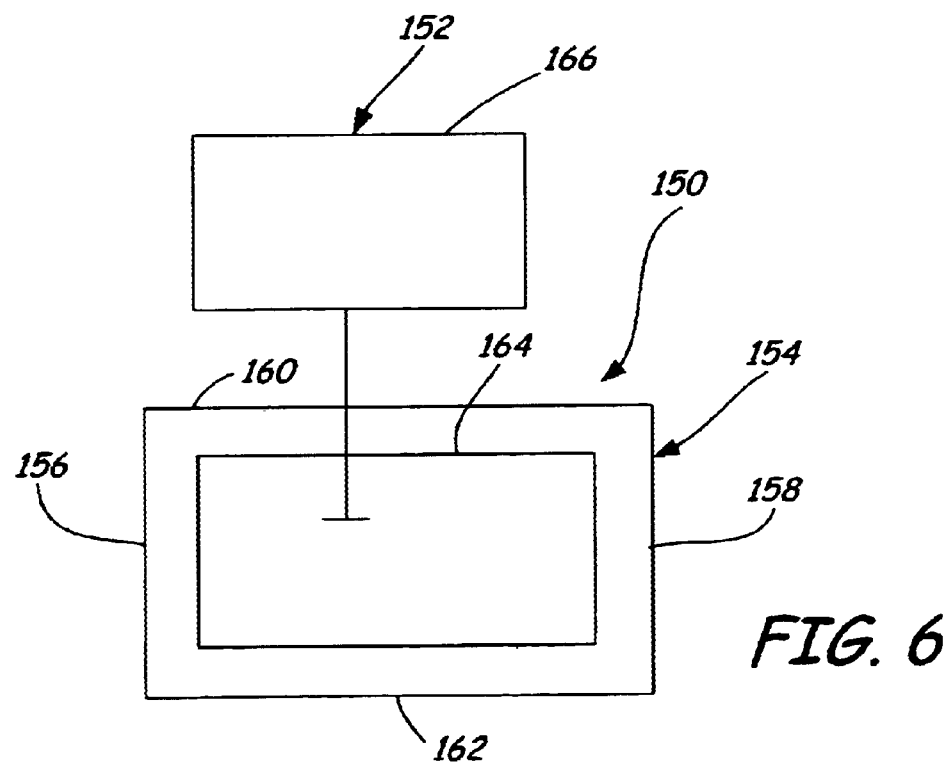
FIG. 6 is a schematic illustration of an embodiment of a glide head of the present invention.

FIG. 6 schematically illustrates a glide head 150 with the anti-collapse protection feature 152 of the present invention. Glide head 150 includes a glide body 154 having a leading edge 156, a trailing edge 158, opposed sides 160, 162, and a raised bearing surface 164. The anti-collapse protection feature 152 includes a textured glide interface 166 as illustrated diagrammatically formed on the raised bearing surface 164 to reduce glide instability and collapse. During operation, glide head 150 can contact the disc surface, particularly at the trailing edge 158 as illustrated in FIG. 4. Glide disc contact introduces a stiction force which at lower operating RPMs and lower glide height can overpower hydrodynamic forces on the bearing surface 164 and collapse the glide head as illustrated in FIG. 5. The textured glide interface 166 provides anti-collapse protection by reducing head-disc interface stiction to increase glide stability.

The glide body of the head is formed of a ceramic substrate, such as a composite of TiC (Titanium carbide) and Alumina ($Al_2O_3$) or other known slider materials. Glide bodies are diced from a wafer substrate and the raised bearing is formed by known milling, etching, and masking techniques. The surface of the raised bearing is formed from the wafer substrate and has a relatively low roughness. As previously described, the raised bearing surface is textured to increase roughness of the bearing surface for anti-collapse protection.

Figure 7:
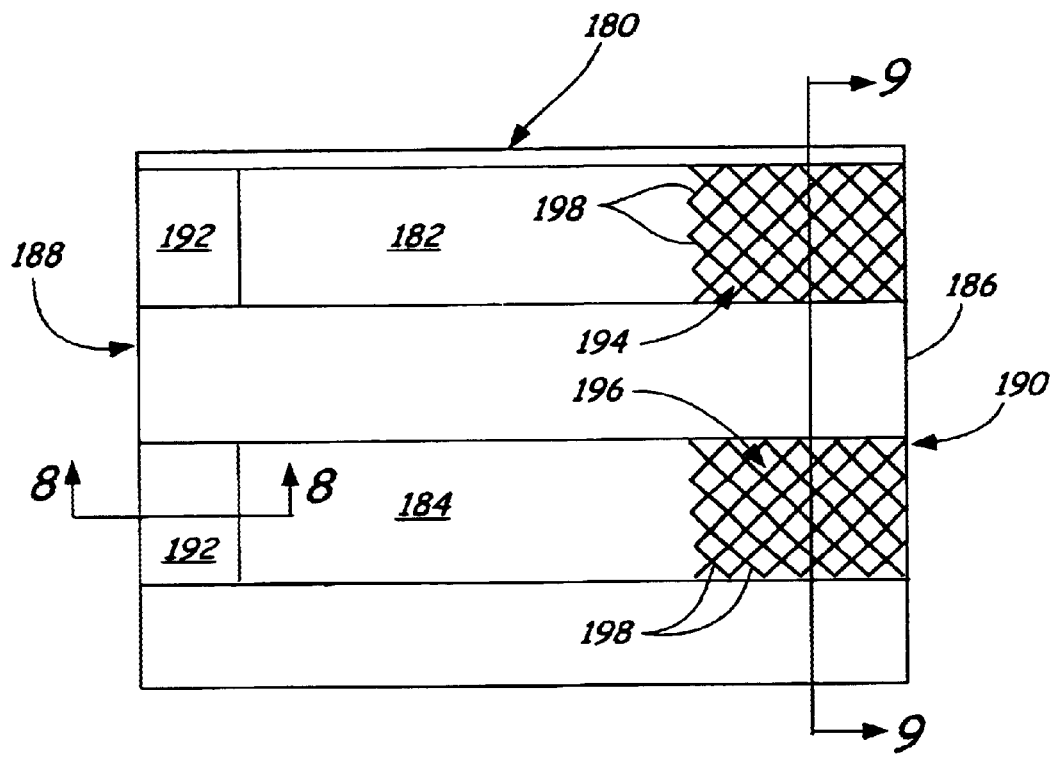
FIG. 7 is a schematic illustration of an embodiment of a glide head including a textured glide interface for glide control.
Figure 8:
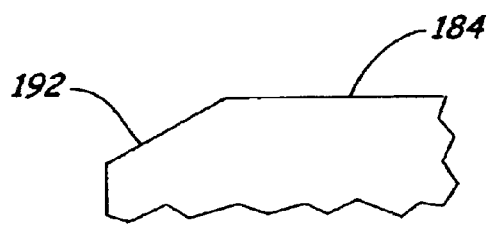
FIG. 8 is cross-sectional view taken along line 8—8 of FIG. 7.
Figure 9:
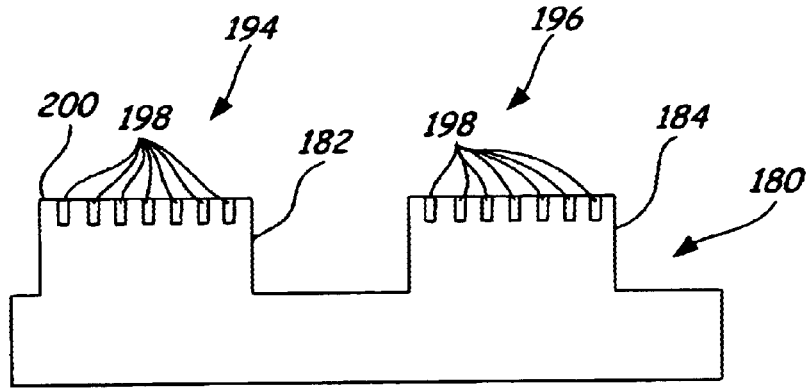
FIG. 9 is a cross-sectional view taken along line 9—9 of FIG. 7.

FIGS. 7–9 illustrate an embodiment of a glide head 180 having raised bearing rails 182, 184 formed on a glide body 186 between leading and trailing edges 188, 190 of the glide body 186. Rails 182, 184 include s sloped leading edge 192 as shown in FIGS. 7–8 and textured surface portions 194, 196 to form a textured glide interface on raised bearing surfaces. The textured surface portions are fabricated by known material removal processes to form a plurality of spaced recess portions on the raised rails 182, 184. The recess portions increase roughness of the substrate surface of the raised rails 182, 184 for glide height stability. In the embodiment shown, rails 182, 184 include a plurality of channels 198 cut into substrate surface 200 of rails 182, 184 to form a plurality of spaced recess portions below the substrate surface of rails 182, 184. In the illustrated embodiment, channels 198 are cut or spaced in a diagonal crisscrossing pattern by a thin saw machine. Alternate patterns can be employed and application is not limited to the particular texture pattern shown.

Figure 10:
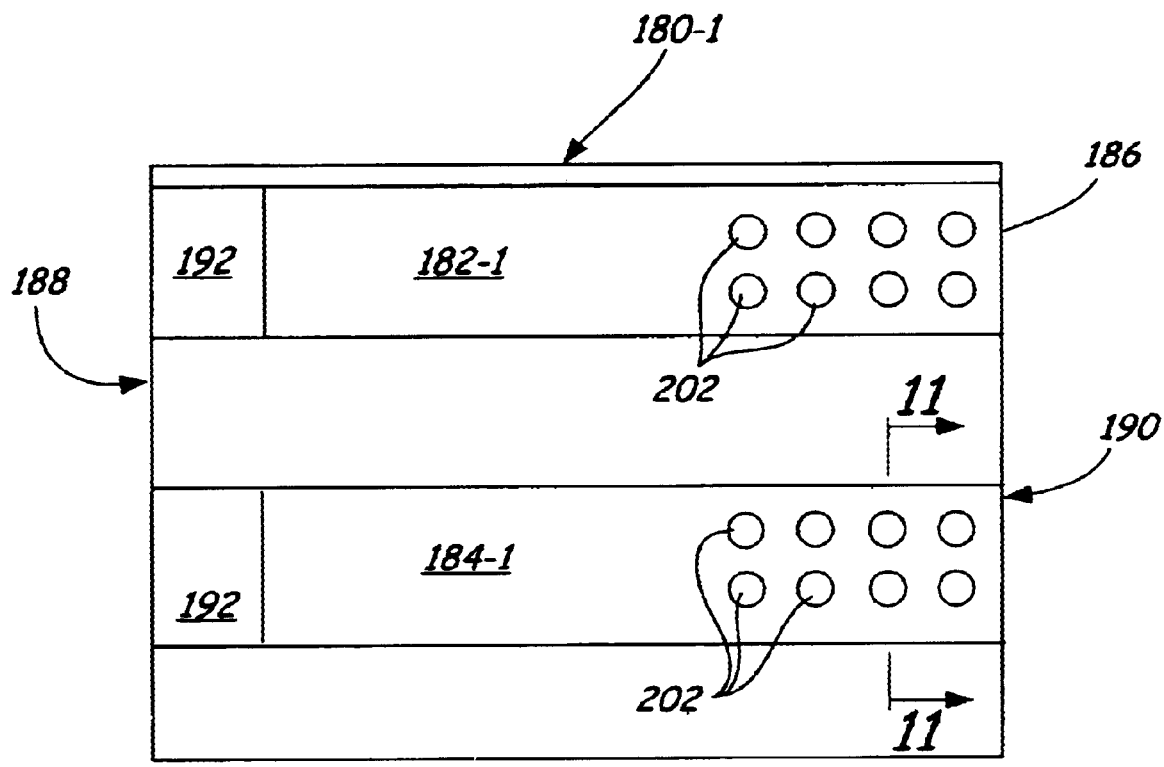
FIG. 10 is a schematic illustration of an embodiment of a glide head including a textured glide interface for glide control.
Figure 11:
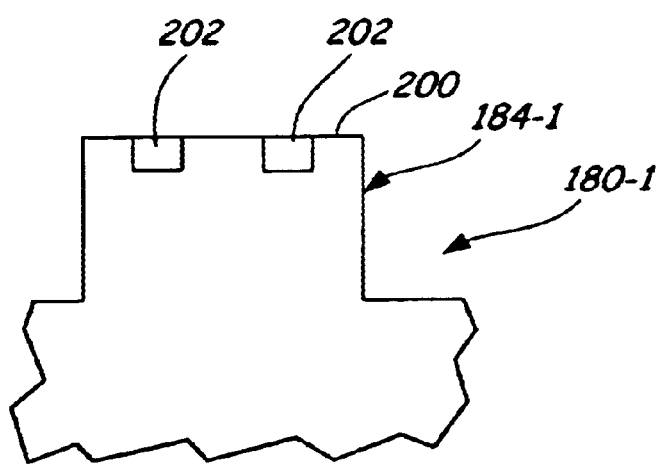
FIG. 11 is a cross-sectional view taken along line 11—11 of FIG. 10.

FIGS. 10–11 illustrate an alternate embodiment for forming recess portions on the raised bearing surface of the head where like numbers are used to refer to like parts in the previous FIGS. As shown, rails 182-1, 184-1 of glide head 180-1 include a plurality of spaced cavities 202 formed on substrate surface 200 of rails 182-1, 184-1. Cavities 202 are recessed below the substrate surface 200 of rails 182-1, 184-1 as shown to increase roughness of the bearing surface of rails 182-1, 184-1. Although a particular number and arrangement of cavities 202 is shown, any number of or arrangement of cavities 202 on rails 182-1, 184-1 can be used. Cavities 202 can be formed by known laser and ion-milling fabrication processes. For ease of manufacture or fabrication, entire rails surfaces can be textured to form the anti-collapse protection feature described. Formation of the recess portions is not limited to the specific sizes and shapes shown nor to any predetermined or random pattern of spaced recess portions.

A glide head supporting a glide transducer for glide test operations. The glide head includes a textured glide interface for glide height stability. The textured glide interface provides an anti-collapse protection feature for glide test operations.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiments described herein relate to particular embodiments, it will be appreciated by those skilled in the art that the teachings of the present invention can be applied to alternate embodiments without departing from the scope and spirit of the present invention.

What is claimed is:

1. A combination comprising:

a glide body having a leading edge, a trailing edge, and opposed sides;

an air bearing surface on the glide body including a raised bearing surface;

at least one glide transducer supported by the glide body separate from the air bearing surface to form a glide head; and a textured glide interface on a trailing edge portion of the raised bearing surface.

2. The combination of claim 1 wherein the textured glide interface includes a plurality of spaced recess portions formed on the raised bearing surface.

3. The combination of claim 2 wherein the plurality of spaced recess portions are laser formed.

4. The combination of claim 1 wherein the textured glide interface includes a pattern of saw cuts in the raised bearing surface.

5. The combination of claim 2 wherein the plurality of spaced recess portions include a plurality of cavities formed on the raised bearing surface.

6. The combination of claim 2 wherein the plurality of spaced recess portions include a plurality of spaced elongated channels formed in the raised bearing surface.

7. The combination of claim 2 wherein the plurality of spaced recess portions are formed by an ion milling process.

8. The combination of claim 1 wherein the glide transducer is one of a piezoelectric transducer, thermal transducer, or capacitance transducer.

9. The combination of claim 1 and further comprising:

an actuator assembly including an actuator arm and the glide head is operably coupled to the actuator arm for glide test operation; and a load/unload ramp to support the glide head during periods of non-operation.

10. The combination of claim 1 and further comprising;

a spindle including a disc coupled thereto and rotatable thereby;

a spindle motor operably coupled to the spindle; and a controller coupled to the spindle motor and configured to operate the spindle motor at an RPM range of 1,000 RPM or less.

11. The combination of claim 1 wherein the raised bearing surface includes opposed side rails and the side rails include first and second textured glide interfaces.

12. A glide head comprising:

a glide body including a raised air bearing and a wing portion supporting a glide transducer; and anti-collapsing means on the raised air bearing for providing anti-collapsing protection for glide height control.

13. A method for glide test operations comprising the steps of:

fabricating a glide head including a raised bearing surface formed on a glide body and a glide transducer separate from and spaced from the raised bearing surface; and fabricating a textured glide interface on the raised bearing surface of the glide body.

14. The method of claim 13 wherein the method of fabricating the textured glide interface comprises:

texturing a substrate surface of the raised bearing surface of the glide body.

15. The method for glide testing of claim 13 wherein the step of fabricating the textured glide interface comprises the step of:

forming a pattern of spaced recess portions on the raised bearing surface.

16. The method for glide testing of claim 15 wherein the step of forming a pattern of spaced recess portions includes a step of:

using a thin saw machine to form the spaced recess portions.

17. The method of claim 13 and further comprising the steps of:

supporting an armature assembly carrying the glide head on an unload/load ramp;

unloading the glide head from the load/unload ramp;

rotating a disc to provide an air flow along a length of the raised bearing surface of the glide head; and measuring a glide quality of the disc.

18. The method of claim 17 wherein the step of measuring the glide quality of the disc comprises the step of:

detecting glide head-disc interface at a predetermined glide height to detect asperities.

19. The method of claim 18 wherein glide head-disc interface is detected by a piezoelectric transducer.

20. The method of claim 13 and further comprising the step of:

measuring a glide quality of a disc using the glide head.

* * * * *